(12) United States Patent
Callas

(10) Patent No.: US 8,220,268 B2
(45) Date of Patent: Jul. 17, 2012

(54) TURBINE ENGINE HAVING FUEL-COOLED AIR INTERCOOLING

(75) Inventor: James John Callas, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1257 days.

(21) Appl. No.: 11/987,199

(22) Filed: Nov. 28, 2007

(65) Prior Publication Data

US 2009/0133400 A1   May 28, 2009

(51) Int. Cl.
F02C 7/08 (2006.01)
F02C 7/10 (2006.01)
(52) U.S. Cl. ............................. 60/736; 60/728; 60/39.511
(58) Field of Classification Search .................... 60/772, 60/736, 728, 39.511
See application file for complete search history.

(56) References Cited

U.S. PATENT DOCUMENTS

| | | | |
|---|---|---|---|
| 2,322,717 A | 6/1943 | Nettel | |
| 2,548,508 A | 4/1951 | Wolfner | |
| 2,602,289 A | 7/1952 | Anxionnaz et al. | |
| 2,718,753 A | 9/1955 | Bridgeman | |
| 2,942,953 A | 6/1960 | Shields | |
| 3,313,103 A * | 4/1967 | Johnson | 60/776 |
| 4,896,499 A * | 1/1990 | Rice | 60/792 |
| 5,191,767 A * | 3/1993 | Kane et al. | 60/728 |
| 5,392,595 A * | 2/1995 | Glickstein et al. | 60/780 |
| 5,513,488 A * | 5/1996 | Fan | 60/775 |
| 5,535,584 A | 7/1996 | Janes | |
| 5,678,408 A | 10/1997 | Janes | |
| 6,173,563 B1 | 1/2001 | Vakil et al. | |
| 6,412,291 B1 | 7/2002 | Erickson | |
| 6,606,864 B2 * | 8/2003 | MacKay | 60/773 |
| 6,637,185 B2 | 10/2003 | Hatamiya et al. | |
| 6,739,119 B2 | 5/2004 | Erickson | |
| 6,920,760 B2 * | 7/2005 | Schottler et al. | 60/772 |
| 6,993,913 B2 | 2/2006 | Kobayashi et al. | |
| 7,007,484 B2 | 3/2006 | Stegmaier et al. | |
| 7,266,946 B2 * | 9/2007 | Fletcher et al. | 60/785 |
| 7,284,377 B2 * | 10/2007 | Joshi et al. | 60/775 |
| 2006/0048808 A1 * | 3/2006 | Ruckman et al. | 136/206 |

OTHER PUBLICATIONS

William E. Lear, Ammonia-Fueled Combustion Turbines, http://www.eneroy.iastate.edu/becon/downloadNH3/2007/Lear_NH3.pdf, downloaded on Nov. 13, 2007.

* cited by examiner

*Primary Examiner* — Ehud Gartenberg
*Assistant Examiner* — Carlos A Rivera
(74) *Attorney, Agent, or Firm* — Finnegan, Henderson, Farabow, Garrett & Dunner LLP

(57) ABSTRACT

A turbine engine is disclosed. The turbine engine may have a first compressor configured to pressurize inlet air, and a second compressor configured to further pressurize the inlet air. The turbine engine may also have a cooling circuit fluidly located to cool the inlet air after the inlet air is pressurized by the first compressor and before the inlet air is further pressurized by the second compressor. The cooling circuit may have a first heat exchanger configured to transfer heat from the inlet air to a fuel of the engine, and a second heat exchanger configured to transfer heat from exhaust of the engine to the fuel of the engine.

17 Claims, 1 Drawing Sheet

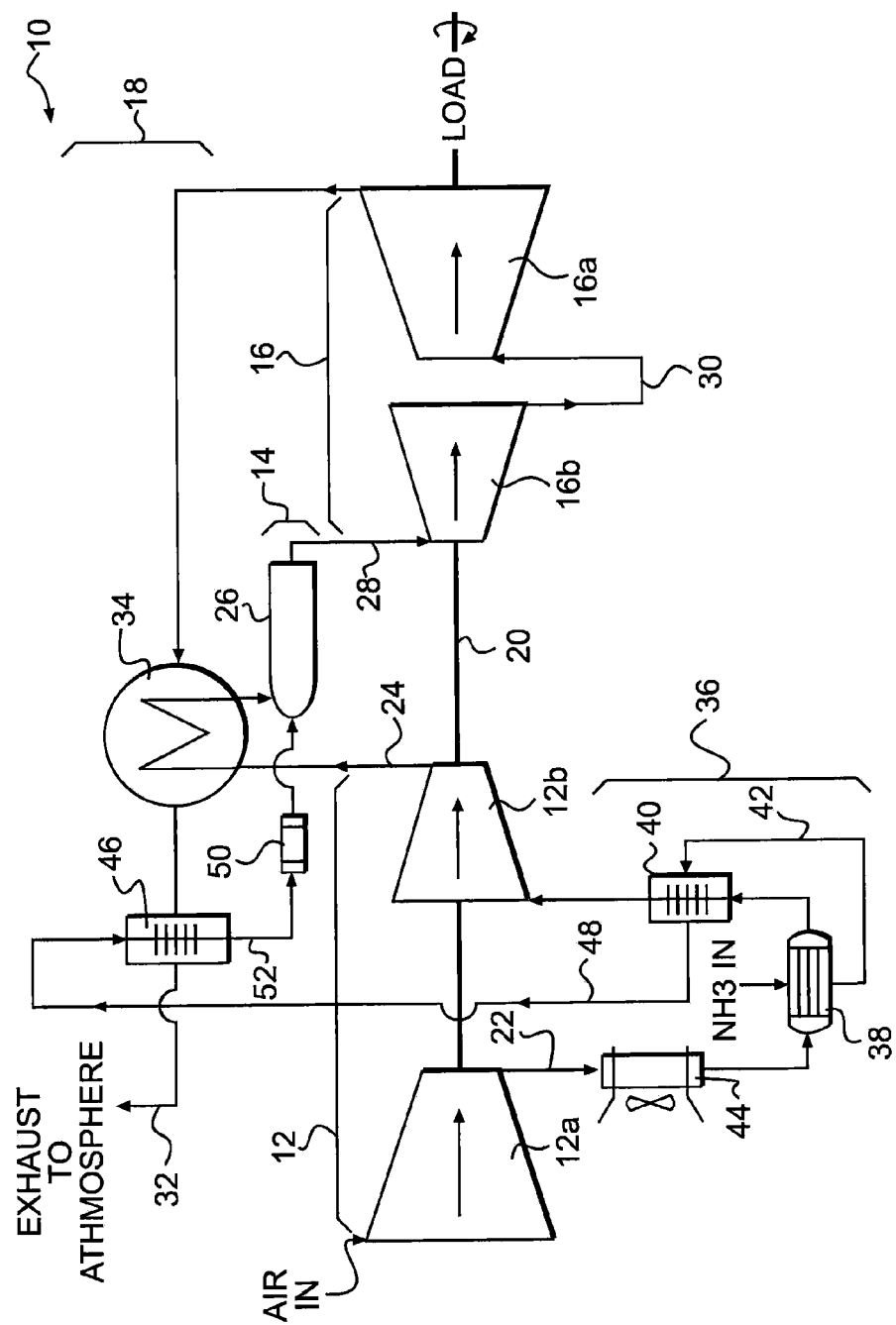

TURBINE ENGINE HAVING FUEL-COOLED AIR INTERCOOLING

TECHNICAL FIELD

The present disclosure relates generally to a turbine engine and, more particularly, to a turbine engine having fuel-cooled air intercooling.

BACKGROUND

Turbine engines typically include a compressor section that draws air into the engine and compresses the air; a combustor section that mixes the compressed air with fuel and ignites the mixture; and a turbine section that converts molecular energy of the combustion process to rotational energy. It has been recognized that the type of fuel used and the state of the fuel when injected and combusted can affect performance of the turbine engine. For example, it is known that anhydrous ammonia ($NH_3$), when combusted, produces low, if any, carbon emissions. However, to enhance combustion of the ammonia, it must first be vaporized and conditioned (catalytically cracked). And, vaporizing and cracking the ammonia can require complicated equipment and energy levels that reduce the engine's efficiency.

To improve efficiency of the turbine engine, intercooling is commonly employed. Intercooling includes removing energy from the air between compression stages. The energy is conventionally removed by way of an air or water heat exchanger. That is, air that has been compressed during a first stage is directed through the heat exchanger before being compressed further during a second stage. A coolant, either air or water, is directed in counter- or cross-flow direction through the heat exchanger to remove energy from the partially compressed air. By removing energy, the work of compression lessens, and more turbine power is available than would have otherwise been possible without intercooling.

An example of an ammonia fueled, intercooled turbine engine is described in a paper (hereinafter "Lear Paper") entitled "Ammonia-Fueled Combustion Turbines" by Lear of the University of Florida Department of Mechanical and Aerospace Engineering. In the Lear Paper, an ammonia fueled turbine engine is described that also includes intercooling. However, instead of using conventional fluids (air or water) to cool the partially compressed air, the Lear Paper discloses using the ammonia fuel to cool the air. That is, ammonia is circulated through an intercooler circuit, where the ammonia is expanded, picks up heat from the partially compressed air, condenses, releases the heat, and then is pumped back through the circuit. Before the ammonia condenses and releases the heat, a portion of the hot vaporized ammonia is redirected to a combustor of the engine, where it mixes with already cooled and further-compressed air and is burned to generate power. Because the fuel of the engine is also used to cool the inlet air, the need for a separate cooling fluid may be reduced. And, the heat picked up by the fuel during the intercooling process may enhance combustion of the fuel.

Although the engine disclosed in the Lear Paper may have low emissions and high efficiency due to the use of ammonia for both fueling and cooling, it may still be suboptimal. That is, the intercooling circuit of the Lear Paper requires excess ammonia be available for the intercooling process. More specifically, the intercooling circuit recycles at least some of the ammonia used to cool the inlet air, with only a portion of the ammonia being directed to the combustor. Because some of the ammonia is recycled, it must, itself, be cooled prior to cooling the inlet air. This additional cooling step may result in a more complex, more expensive, and less efficient system. Further, it may be possible that the heat picked up from the intercooling process by the ammonia is insufficient for optimum combustion thereof. That is, the ammonia may still require an additional step of vaporization/cracking before optimal combustion may take place.

The disclosed turbine engine is directed to overcoming one or more of the problems set forth above.

SUMMARY

In one aspect, the present disclosure is directed to a turbine engine. The turbine engine may include a first compressor configured to pressurize inlet air, and a second compressor configured to further pressurize the inlet air. The turbine engine may also include a cooling circuit located to cool the inlet air after the inlet air is pressurized by the first compressor and before the inlet air is further pressurized by the second compressor. The cooling circuit may include a first heat exchanger configured to transfer heat from the inlet air to a fuel of the engine, and a second heat exchanger configured to transfer heat from exhaust of the engine to the fuel of the engine.

In another aspect, the present disclosure is directed to a method of generating power. The method may include pressurizing air during a first compression stage, and further pressurizing the air during a second compression stage. The method may also include transferring heat from the pressurized air to a fuel between the first and second compression stages, and transferring heat from an exhaust flow to the fuel. The method may further include combusting a mixture of the further pressurized air and the heated fuel.

In yet another aspect, the present disclosure is directed to another turbine engine. This turbine engine may include a first compressor configured to pressurize inlet air, and a second compressor configured to further pressurize the inlet air. The turbine engine may also include a combustor configured to receive and combust a mixture of the further pressurized air and an ammonia fuel. The turbine engine may further include an open loop cooling circuit located to cool the inlet air after the inlet air is pressurized by the first compressor and before the inlet air is further pressurized by the second compressor. The open loop cooling circuit may include a heat exchanger configured to transfer heat from the pressurized inlet air to the ammonia fuel. All of the ammonia fuel passing through the heat exchanger is directed to mix with the cooled and compressed air in the combustor.

BRIEF DESCRIPTION OF THE DRAWING

FIG. 1 is a diagrammatic illustration of an exemplary disclosed turbine engine.

DETAILED DESCRIPTION

FIG. 1 illustrates an exemplary turbine engine 10. Turbine engine 10 may be associated with a stationary or mobile machine configured to accomplish a predetermined task. For example, turbine engine 10 may embody the primary power source of a generator set that produces an electrical power output or of a pumping mechanism that performs a fluid pumping operation. Turbine engine 10 may alternatively embody the prime mover of an earth-moving machine, a passenger vehicle, a marine vessel, or any other mobile machine known in the art. Turbine engine 10 may include a compressor section 12, a combustor section 14, a turbine section 16, and an exhaust section 18.

Compressor section 12 may include components rotatable to compress inlet air. Specifically, compressor section 12 may include a series of rotatable compressor blades (not shown) fixedly connected about a central shaft 20 (i.e., connected to central shaft 20 or to a housing disposed about central shaft 20). As central shaft 20 is rotated, air may be drawn into turbine engine 10 and pressurized. As illustrated in FIG. 1, turbine engine 10 may be a multi-stage turbine engine. That is, turbine engine 10 may include at least two compressor sections 12, for example, a low pressure section (LPS) 12a and a high pressure section (HPS) 12b fluidly interconnected by way of a passage 22. LPS 12a may receive inlet air and pressurize the inlet air to a first pressure level. HPS 12b may receive the partially compressed air from LPS 12a via passage 22 and further pressurize the air to a second pressure level. This highly pressurized air may then be directed from HPS 12b toward combustor section 14 for mixture with a liquid and/or gaseous fuel.

Combustor section 14 may mix fuel, for example anhydrous ammonia ($NH_3$), with the compressed air received from HPS 12b (by way of a passage 24), and combust the mixture to create a mechanical (i.e., rotational) work output. Specifically, combustor section 14 may include a combustion chamber 26, and one or more fuel nozzles (not shown) associated with combustion chamber 26. Each fuel nozzle may inject or otherwise deliver one or both of liquid and gaseous fuel into the flow of compressed air from HPS 12b for ignition within combustion chamber 26. As the fuel/air mixture combusts, heated molecules may expand and move at high speed into turbine section 16 by way of a passage 28.

Turbine section 16 may include components rotatable in response to the flow of expanding exhaust gases from combustor section 14. In particular, turbine section 16 may include a series of rotatable turbine blades (not shown) fixedly connected about central shaft 20 (i.e., connected to central shaft 20 or to a housing disposed about central shaft 20). Similar to compressor section 12, turbine section 16 may also include a low pressure section (LPS) 16a and a high pressure section (HPS) 16b fluidly connected by way of a passage 30. As the turbine blades of LPS 16a and HPS 16b are bombarded with high-energy molecules from combustor section 14, the expanding molecules may cause central shaft 20 to rotate, thereby converting combustion energy into useful rotational power. In one embodiment, LPS 16a may be connected to a separate power shaft that drives an external load such as generator, if desired. This rotational power may then be drawn from turbine engine 10 and used for a variety of purposes. In addition to powering various external devices, the rotation of the turbine rotor blades and central shaft 20 may drive the rotation of the compressor blades within LPS 12a and HPS 12b.

Exhaust section 18 may direct spent exhaust from turbine section 16 to the atmosphere by way of a passage 32. It is contemplated that exhaust section 18 may include one or more treatment devices configured to remove and/or condition pollutants from the exhaust and/or attenuation devices configured to reduce the noise associated with turbine engine 10, if desired.

A recuperator 34 may be situated to transfer heat between exhaust section 18 and compressor section 12. That is, recuperator 34 may be located within passage 24 and embody a gas-to-gas heat exchanger fluidly communicating exhaust with the compressed air exiting HPS 12b and the exhaust exiting LPS 16a. As the compressed air and exhaust move through recuperator 34, heat from the exhaust may be absorbed by the relatively cooler air. In this manner, heat that would otherwise be discharged to the atmosphere, may be recycled back into turbine engine 10, thereby increasing the efficiency of turbine engine 10.

Turbine engine 10 may also include a cooling circuit 36 that functions to further increase the efficiency of turbine engine 10. Cooling circuit 36 may include components that transfer heat away from inlet air that has been partially compressed by LPS 12a before it is further compressed by HPS 12b. In particular, cooling circuit 36 may include an upstream heat exchanger 38, and a downstream heat exchanger 40 disposed in series configuration. Heat exchanger 38 may be a gas-to-liquid type heat exchanger configured to transfer heat from the partially compressed inlet air to a cooling fluid in liquid state. It is contemplated that, as the cooling fluid picks up heat from the inlet air, it may change states from a liquid state to gaseous state within heat exchanger 38 or soon after exiting heat exchanger 38. Heat exchanger 40 may be a gas-to-gas type heat exchanger configured to transfer heat from the partially compressed and partially cooled inlet air to the cooling fluid after the cooling fluid has changed to the gaseous state. Heat exchangers 38, 40 may be connected to communicate cooling fluid by way of a passage 42. In one embodiment, the cooling fluid may be the fuel (i.e., $NH_3$) subsequently injected into and burned within combustion chamber 26. Substantially all of the fuel used to cool the inlet air may be directed to combustion chamber 26 (i.e., no fuel may be recirculated through cooling circuit 36).

It is contemplated that, if heat exchangers 38 and 40 remove insufficient amounts of heat from the partially compressed inlet air, an additional heat exchanger 44 may be utilized and located upstream of heat exchanger 38, if desired. Heat exchanger 44 may be a conventional heat exchanger (gas-to-gas or gas-to-liquid) that utilizes air or water as the cooling fluid. A fan may be associated with heat exchanger 44, if desired, to enhance heat transfer with the cooling fluid.

In some situations, the amount of heat absorbed by the fuel from the inlet air may be insufficient to suitably prepare the fuel for combustion (i.e., to vaporize/crack the fuel). To enhance combustion of the fuel, the fuel may be directed to absorb heat from exhaust section 18 prior to entering combustion chamber 26. In particular, a fourth heat exchanger 46 may be located downstream of heat exchanger 40 to receive the partially heated fuel via a passage 48. Heat exchanger 46 may be a gas-to-gas type heat exchanger configured to transfer heat from the exhaust exiting recuperator 34 to the fuel as the fuel passes through heat exchanger 46. It is contemplated that heat exchanger 46 may alternatively be located between recuperator 34 and LPS 16a to transfer a greater amount of heat to the fuel, if desired. A catalytic cracker 50 may be disposed within a passage 52 connecting heat exchanger 46 and combustion chamber 26. Catalytic cracker 50 may be configured to condition the vaporized fuel in preparation for combustion.

Industrial Applicability

The disclosed turbine engine may be applicable to any mobile or stationary machine where reduced emissions and increased efficiency are desired. The disclosed turbine engine may reduce emissions by utilizing a low carbon fuel. In addition, the disclosed turbine engine may use the low carbon fuel as a refrigerant to cool inlet air between compression stages, thereby improving the operational efficiency of the engine. The operation of turbine engine 10 will now be explained.

During operation of turbine engine 10, air may be drawn into turbine engine 10, compressed via compressor section 12, and directed into combustor section 14. As the flow of compressed air is directed into combustor section 14, liquid fuel, gaseous fuel, or a mixture of liquid and gaseous fuel may be injected for mixing with the air prior to or simultaneous with combustion. As the mixture of fuel and air enters combustion chamber 26, it may ignite and combust. The hot expanding exhaust gases may then be expelled into turbine section 16, where the resulting molecular energy of the combustion gases may be converted to rotational energy of turbine rotor blades and central shaft 20.

Between stages of compression, the inlet air may be cooled by the fuel prior to combustion of the fuel. Specifically, liquid fuel ($NH_3$) may be directed to heat exchanger 38, where it may pick up some heat from the inlet air after the air has been partially compressed by LPS 12a and before the air enters HPS 12b. While passing through heat exchanger 38, or soon thereafter, the now heated liquid fuel may vaporize to a gaseous state. While in the gaseous state, the vaporized fuel may pass through heat exchanger 40 to absorb additional heat from the partially compressed inlet air. After passing through both of heat exchangers 38 and 40, the partially compressed and now cooled inlet air may enter HPS 12b for further pressurizing. By cooling the partially compressed air prior to entering HPS 12b, the air may become denser and more air can be pressurized and combusted than would have been possible without the intercooling process. The increased amount of air being pressurized and cooled may help to increase the efficiency of turbine engine 10. In one embodiment, heat exchanger 44, a conventional intercooler, may also be included and utilized to further reduce the temperature of the partially compressed inlet air and improve the turbine engine efficiency even more, if desired.

Once fully pressurized, the inlet air may be directed to recuperator 34 where it may absorb heat from the high temperature exhaust exiting turbine section 16, just prior to entering combustion chamber 26. In this manner, the heat from exhaust section 18 may be recycled through turbine engine 10 rather than being discharged to the atmosphere. The recycled heat may help to improve combustion efficiency within turbine engine 10.

In some situations, it may be possible that the amount of heat absorbed by the fuel as it passes through heat exchangers 38 and 40 is insufficient to prepare the fuel for optimum combustion. In these situations, the fuel may then be directed through heat exchanger 46 to absorb additional heat from the high temperature exhaust exiting turbine section 16. After exiting heat exchanger 46, the fuel may be directed through catalytic cracker 50 for further conditioning before entering combustion chamber 26.

Several advantages may be associated with turbine engine 10. Specifically, because all of the ammonia utilized to chill the partially compressed inlet air may be passed directly on for use as a fuel, turbine engine 10 may be simple and efficient. That is, none of the ammonia fuel may be recycled through cooling circuit 36 and, thus, may not require an additional step to cool the ammonia. By omitting this additional step, cooling circuit 36 may be relatively uncomplicated. And, because the ammonia may require minimal cooling itself, efficiency of turbine engine 10 may be high. Further, by directing the ammonia fuel to absorb heat from both the inlet air and from the engine's exhaust, the fuel may be sufficiently heated for optimum combustion without the need for further vaporization.

It will be apparent to those skilled in the art that various modifications and variations can be made to the disclosed turbine engine. Other embodiments will be apparent to those skilled in the art from consideration of the specification and practice of the disclosed turbine engine. It is intended that the specification and examples be considered as exemplary only, with a true scope being indicated by the following claims and their equivalents.

What is claimed is:

1. A turbine engine, comprising:
   a first compressor configured to pressurize inlet air;
   a second compressor configured to further pressurize the inlet air;
   a cooling circuit located to cool the inlet air after the inlet air is pressurized by the first compressor and before the inlet air is further pressurized by the second compressor, the cooling circuit including:
     a first heat exchanger configured to transfer heat from the inlet air to a fuel of the engine; and
     a second gas-to-gas heat exchanger configured to transfer heat from the inlet air to the fuel;
   a third heat exchanger configured to transfer heat from exhaust of the engine to the fuel of the engine.

2. The turbine engine of claim 1, wherein the first heat exchanger is a liquid-to-gas type heat exchanger.

3. The turbine engine of claim 1, further including a fourth heat exchanger located upstream of the first heat exchanger and configured to transfer heat from the inlet air to a coolant different from the fuel.

4. The turbine engine of claim 1, further including a catalytic cracker configured to receive fuel from the third heat exchanger and condition the fuel for combustion.

5. The turbine engine of claim 1, further including a combustor configured to receive the cooled and compressed inlet air, wherein all of the fuel passing through the first, second, and third heat exchangers is directed to mix and combust with the cooled and compressed air in the combustor.

6. The turbine engine of claim 1, wherein the cooling circuit is an open loop.

7. The turbine engine of claim 1, further including a recuperator configured to transfer heat from the exhaust to the inlet air after the inlet air has been further pressurized by the second compressor.

8. The turbine engine of claim 1, wherein the fuel is anhydrous ammonia.

9. A method of generating power, comprising:
   pressurizing air during a first compression stage;
   further pressurizing the air during a second compression stage;
   transferring heat with a first heat exchanger from the pressurized air to a fuel between the first and second compression stages when the fuel is in a liquid state;
   transferring heat with a second heat exchanger from the air to the fuel between the first and second compression stages when the fuel is in gaseous state;
   transferring heat with a third heat exchanger from an exhaust flow to the fuel; and combusting a mixture of the further pressurized air and the heated fuel.

10. The method of claim 9, further including transferring heat with a fourth heat exchanger from the air to a coolant different from the fuel.

11. The method of claim 9, further including cracking the fuel prior to combusting the mixture.

12. The method of claim 9, wherein all of the fuel receiving heat from the air is directed to mix with the further pressurized air.

13. The method of claim 9, further including transferring heat with a recuperator from the exhaust flow to the air exiting said second compression stage.

14. The method of claim 9, wherein the fuel is anhydrous ammonia.

15. An engine, comprising:

a first compressor configured to pressurize inlet air;

a second compressor configured to further pressurize the inlet air;

a combustor configured to receive and combust a mixture of the further pressurized air and an ammonia fuel; and an open loop cooling circuit located to cool the inlet air after the inlet air is pressurized by the first compressor and before the inlet air is further pressurized by the second compressor, the open loop cooling circuit including:

a first liquid-to-gas heat exchanger configured to transfer heat from the pressurized inlet air to the ammonia fuel, a second gas-to-gas heat exchanger located downstream of the first liquid-to-gas heat exchanger configured to transfer heat from the pressurized inlet air to the ammonia fuel, wherein all of the ammonia fuel passing through the heat exchanger is directed to mix and combust with the cooled and compressed air in the combustor.

16. The engine of claim 15, further including a catalytic cracker configured to receive the ammonia fuel from the heat exchanger and condition the ammonia fuel for combustion.

17. The engine of claim 15, further including a recuperator configured to transfer heat from an exhaust flow to the inlet air after the inlet air has been further pressurized by the second compressor.

\* \* \* \* \*